US005652047A

United States Patent [19]
Hesse et al.

[11] Patent Number: 5,652,047
[45] Date of Patent: Jul. 29, 1997

[54] BINDER RESINS FOR THE PREPARATION OF FIBER COMPOSITES

[75] Inventors: Wolfgang Hesse, Taunusstein; Erhard Leicht, Hofheim; Richard Sattelmeyer; Ralph Schaefer, both of Wiesbaden, all of Germany

[73] Assignee: Hoechst Aktiengesellschaft, Germany

[21] Appl. No.: 650,729

[22] Filed: May 20, 1996

Related U.S. Application Data

[60] Continuation of Ser. No. 449,292, May 24, 1995, abandoned, which is a division of Ser. No. 901,085, Jun. 19, 1992.

[30] Foreign Application Priority Data

Jun. 21, 1991 [DE] Germany .......................... 41 20 582.0

[51] Int. Cl.⁶ .............................. C08L 61/14; C08L 75/08
[52] U.S. Cl. .......................... 442/327; 428/286; 428/288; 428/332; 428/339; 428/524; 524/541; 525/480; 525/504
[58] Field of Search .................................. 428/224, 286, 428/288, 332, 339, 524; 525/480, 504; 524/541

[56] References Cited

U.S. PATENT DOCUMENTS 4,179,427  12/1979  Gardikes et al. ...................... 523/143

*Primary Examiner*—Irina S. Zemel
*Attorney, Agent, or Firm*—Bierman, Muserlian and Lucas LLP

[57] ABSTRACT

Preparation of binder resins having improved flow properties in the manufacture of curable fiber composites of natural or synthetic fiber materials, which are based on thermosetting novolaks which contain crosslinking agents and contain practically no free mononuclear phenols, by admixing polyglycols and/or polycarboxylic acids or anhydrides thereof and/or acid esters of polyglycols and polycarboxylic acids, preferably in amounts of in total up to 20% by weight, to the novolaks in the melt, pulverizing the mixture, after cooling to room temperature, and mixing it intimately with the required amount of pulverulent crosslinking agent.

10 Claims, No Drawings

BINDER RESINS FOR THE PREPARATION OF FIBER COMPOSITES

This application is a continuation of U.S. patent application Ser. No. 08/449,292 filed May 24, 1995, now abandoned, which is a divisional of U.S. patent application Ser. No. 07/901,085 filed Jun. 19, 1992.

The invention relates to binder resins having improved flow properties in the preparation of curable fiber composites of naturally occurring or synthetic fiber materials, which are based on thermosetting novolaks which contain crosslinking agents and if appropriate other customary auxiliaries and fillers and contain no free mononuclear phenols, with additional components in the novolaks of compounds from the group comprising polyglycols, polycarboxylic acids and anhydrides thereof and acid esters of polyglycols and polycarboxylic acids, processes for their preparation and their use for the production of cured fiber composite moldings.

The use of curable phenolic resins of the novolak type as binders together with curing agents for the preparation of fiber composites of fibrous materials, preferably textile fibers, and insulating or upholstery mats produced therefrom, as well as of moldings of the most diverse type, the density of which can largely be adapted to the proposed use, is known and is practiced. Fiber materials used are, for example, fiber fleeces or fiber-woven fabrics of naturally occurring or synthetic fibers, staple fibers, non-wovens or reprocessed fibers, preferably of textile origin, preferably organic or if appropriate inorganic naturally occurring or synthetic fibers. For this use, curable novolaks containing phenol are intimately mixed with the curing agents, which are compounds which contain methylol groups or donate methylene groups, preferably hexamethylenetetramine or melamine resins, in the form of fine powders together with the fiber materials, and the mixture is then cured, while shaping, by the action of heat at temperatures above 120° C. In addition to the resin component and the curing agent, the binder can also additionally comprise other constituents, such as, for example, pigments, customary processing auxiliaries, inorganic fillers, waxes and metal salts, such as, for example, aluminum stearate. The binder powders can be sprayed with small amounts of mineral oils to bind dust particles.

In the preparation of fiber composites from fiber fleeces, the resin component with the curing agent addition is mixed in the required amount with the fiber materials to be bound, which are preferably in the form of flat continuous webs of uniform layer thickness, or are applied to these. The binder-containing fiber material is brought to a temperature of about 100° C. by the subsequent action of heat, during which partial curing of the resin system can take place and, applying a slight leveling pressing pressure matched to the desired density of the fiber fleece, binding of the fiber material to prefabricated products, preferably plate-like prefabricated products having layer thicknesses of 0.5 to 10 cm, can be achieved. The prefabricated products can then be converted into end products by heating them to temperatures of more than 120° C., preferably up to 200° C., while shaping and under a higher pressing pressure if necessary, further curing to the desired state of crosslinking taking place. In this way, for example, cured automobile components, such as door linings, hat shelves or other shaped objects, can be produced from prefabricated products as required. The finished products obtained by this process can also be subjected to a surface treatment, such as, for example, painting, laminating and the like, to achieve an attractive visual appearance.

The phenolic resins of the novolak type used as binders can be prepared by condensation of mononuclear or polynuclear phenols, preferably phenol, resorcinol or phenol and/or bisphenols with less than the molar amount of formaldehyde, and can be largely freed from non-bonded and distillable mononuclear phenols by distillation at the end of the production process. If the novolak is now to be used as a binder resin for fiber composites, complete removal of the non-bonded free phenol is not desirable, since after removal of the phenol, the processing properties of the resin are impaired and the gelling time and the flow path no longer meet requirements. To be able to be used as a fiber fleece binder, the novolak must still contain noticeable amounts of free phenol, although this has a detrimental and adverse effect both in respect of smell and toxicologically during processing of the resin and also in the cured end products. Free phenol thus escapes from the finished component, especially under the action of higher temperatures, and in particular under any additional action of moisture, and leads to undesirable emissions. Even if such emissions of gas are still significantly below toxicologically acceptable limits, for example the maximum workplace concentration value, and thus do not represent an acute risk from the occupational medicine aspect, the odor nuisance at least is very troublesome and complete removal or reduction of the free phenol is an urgent problem. This problem is of particular importance in end products for daily use, such as, for example, the moldings, insulating materials or lining elements installed in vehicles. The use of phenol-free novolak resins based on polyphenols as binder resins, for example, could meet the requirement of absence of emission here. However, because of their inadequate flow properties, inadequate mechanical strength, lack of fiber-binding capacity and inadequate crosslinking activity, these resins have so far not been able to find acceptance in the preparation of fiber composites.

The invention was therefore based on the object of providing emission-free binder resins which are based on phenolic resins, do not have the disadvantages described and can meet all the technical, technological and toxicological requirements to be imposed on binder resins for fiber composites.

It has now been found, surprisingly, that customary novolak resins which are largely free from mononuclear phenols, preferably free from phenol, can advantageously be employed as binders for fiber composites if compounds from the group comprising polyglycols, polycarboxylic acids and anhydrides thereof and acid esters of the polyglycols and polycarboxylic acids mentioned are admixed as additional components, preferably in the melt, to the phenol-free novolak.

The invention therefore relates to binder resins which have improved flow properties in the preparation of fiber composites and are based on thermosetting novolaks which contain crosslinking agents and contain no or no substantial amounts of free mononuclear phenols, wherein the novolaks contain polyglycols and/or polycarboxylic acids and/or polycarboxylic acid anhydrides and/or acid esters of polyglycols and polycarboxylic acids as additional components.

The proportion of these additional components in total is preferably 0.5 to 20% by weight, particularly preferably 0.8 to 10% by weight, especially preferably 1 to 8% by weight, based on the phenol-free novolak.

In the largely phenol-free novolaks to be used according to the invention, the content of free phenol is <1% by weight, preferably <0.3% by weight, in particular <0.05% by weight, based on the novolak. The novolaks can contain condensation products of formaldehyde and mononuclear and/or polynuclear phenols. Among the mononuclear phenols, phenol is preferred here, and among the polynuclear phenols, the bisphenols, preferably from the group comprising diphenylolmethane and 4,4'-diphenylolpropane, are preferred. Those phenol-free novolak resins which have been prepared in the absence of mononuclear starting phenols, such as, for example, phenol/formaldehyde condensation products based on bisphenols, for example diphenylolmethane or p,p'-diphenylolpropane, are preferred.

Those phenol-free novolaks in which the molar ratio of the phenolic component to formaldehyde in the condensation product is 1:0.4 to 1:0.9 are furthermore preferred. Phenol-free novolaks having a melting point, according to DIN 53736, in the range from 35° C. to 120° C. are also preferred.

Phenol-free novolaks, 50% strength by weight solutions of which in 1-methoxy-2-propanol have a viscosity at 23° C. in the range from 100 to 3000 mPa·s, measured in accordance with DIN 53177, are furthermore preferred.

Possible polyglycols are, preferably, heat-stable aliphatic oligomeric or polymeric ethers of diols, in particular of alkylene glycols or of alkanediols having at least 3 alkylenoxy base units in the polyglycol ether molecule and terminal hydroxyl groups, in particular those polyglycols which are liquid at temperatures above 5° C. Preferred polyglycols are, for example, oligomeric or polymeric ethers of ethylene glycol, propylene glycol or butylene glycol, or mixed ethers of these glycols. Triethylene glycol, tetraethylene glycol, pentaethylene glycol or mixtures of these polyglycols are particularly preferred.

Polycarboxylic acids which can be used are, preferably, heat-stable polycarboxylic acids which contain at least 2 carboxyl groups in the molecule, in particular, for example, from the group comprising phthalic acid, maleic acid, fumaric acid, adipic acid, succinic acid and trimellitic acid, or anhydrides of the acids mentioned, or acid esters of the polycarboxylic acids mentioned with the polyglycols, preferably maleic acid half-esters.

The low-phenol or phenol-free novolaks are prepared by customary processes, for example from mononuclear phenols, preferably from phenol or/and from low molecular weight bis- or polyphenols by condensation with less than the molar amount of formaldehyde, and at the end of the preparation process are freed from any mononuclear phenols still present, in particular phenol, by distillation. The additional components according to the invention of polyglycol and/or polycarboxylic acid and/or polycarboxylic acid anhydride and/or acid esters of polyglycol and polycarboxylic acid are added to and homogeneously distributed in the resulting low-phenol or phenol-free novolak in the melt, and are preferably dissolved in the novolak melt, and after the mixture has cooled to room temperature, it is ground to a fine powder.

Customary compounds which contain methylol groups or split off methyl groups, such as, for example, hexamethylenetetramine (abbreviated to: hexa) or a melamine resin or a furan resin, preferably hexa, are admixed at room temperature, preferably in powder form, as curing agents to the novolak mixed with the additional components according to the invention and are uniformly distributed heterogeneously or homogeneously in the customary manner. The optimum amount of curing agent required for thermal curing must be determined in preliminary experiments and is in general in the range from 2 to 20% by weight, preferably 5 to 15% by weight, based on the mixture of novolak and additional component.

The binder resins according to the invention can be modified for adaptation to requirements in practice by additions of other customary substances in the customary amounts, preferably auxiliaries and fillers, whereby various properties of the resins during processing and in the end product can be influenced in an advantageous manner. Thus, for example, paraffin waxes, ester waxes, such as, for example, carnauba wax, montan waxes, polyethylene waxes and metal salts of higher fatty acids, such as, for example, calcium stearate or aluminum stearate, can be co-used to improve the mold release properties of the end products. The flow properties of the binder resin powder, inter alia, can be improved by additions of pulverulent inorganic substances, such as, for example, kaolin or rock powders, or the flammability of the resin can be reduced and its heat stability improved by addition of calcium borate. Pigments can also advantageously be co-used. The formation of dust and therefore, inter alia, the risk of explosion in closed rooms can be greatly reduced by spraying small amounts of viscous mineral oils or naturally occurring or synthetic oils onto the resin powders during their fabrication. Fabrication of binder resins according to the invention can advantageously be carried out in the customary grinding and mixing units for the preparation of pulverulent mixtures, the individual binder components being metered into the mixer as powders having the required particle size distribution.

The invention therefore furthermore relates to a process for the preparation of binder resins according to the invention by adding the additional components to and uniformly distributing them in phenol-free or low-phenol novolaks in the melt, preferably dissolving them in the melt, cooling the resulting melt to room temperature, pulverizing the solid in a grinding device so that at least 70% by weight of the resin mass has a particle size of <40 μm, subsequently mixing the resin powder intimately with the pulverulent crosslinking agent and if appropriate distributing other auxiliaries and fillers, preferably in powder form, uniformly in the binder resin, and preferably obtaining the binder resin in a fine powder form.

The invention furthermore also relates to the use of binder resins according to the invention for the production of cured fiber composite moldings, by distributing the binder resin in the required amount in powder form in naturally occurring or synthetic fiber material, preferably fiber fleeces or fiberwoven fabrics in the form of sheet-like webs having a uniform layer thickness, heating the material to about 100° C. under a slight leveling pressing pressure, partial curing of the resin taking place and the fiber material being glued to a prefabricated product, preferably a plate-like prefabricated product having layer thicknesses of up to 10 cm, and subsequently heating the prefabricated product to above 120° C., preferably to 120 to 200° C., in particular to 180° C., while shaping and under a higher pressing pressure if necessary, further curing of the binder resin into the desired final crosslinking state taking place and the cured fiber composite molding being obtained.

The invention thus also relates to a process for the production of cured fiber composite moldings using binder resins according to the invention as described above.

The invention furthermore relates to cured fiber composite moldings produced using binder resins according to the invention.

The invention is illustrated in more detail by the following examples.

Example 1

A) Preparation of a phenol-free novolak 20 parts by weight of aqueous formaldehyde (30% strength by weight), 74 parts by weight of xylene and 114 parts by weight of p,p'-diphenylolpropane are initially introduced into a boiler provided with a reflux condenser, descending condenser, water separator, thermometer, stirrer, heating unit and a device for applying vacuum. The mixture is heated to 80° C. A further 114 parts by weight of p,p'-diphenylolpropane, 18.8 parts by weight of paraformaldehyde (96% strength by weight) and 0.75 part by weight of oxalic acid (containing water of crystallization) are introduced, while stirring. The mixture is boiled under reflux for 4½ hours, while stirring. The content of free formaldehyde drops to 0.83% by weight. The water is then distilled off azeotropically. This gives 27 parts by weight of water containing 1.83% by weight of formaldehyde. The xylene is distilled off over the descending condenser, initially under normal pressure, and after a bottom temperature of 180° C. has been reached, in vacuo. When a bottom temperature of 200° C. has been reached, this is maintained for a further 15 minutes; the resin is then drained off.

237 parts by weight of novolak having a melting point according to DIN 53736 of 108° C. and a color number of 3 (according to Hellige) are obtained. The content of free phenol in the novolak is below 0.05% by weight, based on the novolak. The resin is odorless and resistant to yellowing. The viscosity of a 50% strength by weight solution of the novolak in 1-methoxy-2-propanol at 23° C., measured in accordance with DIN 53177, is 1800 mPa·s.

B) Preparation of a novolak modified according to the invention 96 parts by weight of a phenol-free novolak prepared according to Example 1A and having a melting point of 108° C. are melted and 4 parts by weight of triethylene glycol are added to and uniformly distributed in the melt at 180° C., the compound dissolving in the melt. The resulting resin is drained off and cooled to room temperature. Its melting point, measured in accordance with DIN 53736, is 92° C. The content of free phenol in the modified novolak is below 0.05% by weight, based on the novolak.

Comparison Example 1

Preparation of a phenol-containing novolak 96 parts by weight of a phenol-free novolak prepared according to Example 1A and having a melting point of 108° C. are melted and 4 parts by weight of phenol are added to and uniformly distributed in the melt at 180° C., the compound dissolving in the melt. The resulting phenol-containing resin is drained off and cooled to room temperature. Its melting point, measured in accordance with DIN 53736, is 89° C.

Example 2 and Comparison Examples 2 and 3

Use technology tests

For comparative tests, the novolaks according to Examples 1A and 1B and according to Comparison Example 1 are in each case ground to powders in the customary manner, so that at least 70% by weight of the resin mass in each case has a particle size of <40 μm. Pulverulent hexa is then admixed to and uniformly distributed in each of the ground resin powders as a curing agent in a weight ratio of resin:hexa=90:10. The following use technology tests are carried out on the resulting binder resin/curing agent mixtures:

a) Determination of the melt viscosity (in Pa·s) in accordance with DIN 53229 at 125° C. and at 150° C.

b) Determination of the flow path in mm at 125° C. in accordance with DIN 16916.

c) Preparation of a fiber composite with cotton fibers of in each case 80% by weight of cotton fibers and 20% by weight of binder resin/curing agent mixture.

For this preparation, the pulverulent binder resin/curing agent mixture is in each case distributed uniformly in a cotton fiber fleece and converted into a partly cured fiber fleece prefabricated product under a gentle leveling pressing pressure at 100° C. for 5 minutes. The prefabricated products prepared in this way are then heated at 180° C. between two pressing plates under a pressure of 10 bar for 2 minutes for complete curing, and the resulting test specimen is then evaluated at room temperature according to its property characteristics which can be determined subjectively, such as dimensional stability, bending properties, breaking properties, state of crosslinking and degree of wetting or covering of the cotton fibers by the resin. The results of Example 2 and Comparison Examples 2 and 3 are summarized in Table 1.

TABLE 1

| | Example 2 | Comparison Example 2 | Comparison Example 3 |
|---|---|---|---|
| Binder constituents | Binder composition in [parts by weight] | | |
| Modified novolak from Example 1B | 90 | — | — |
| Novolak from Example 1A | — | 90 | — |
| Novolak from Comparison Example 1 | — | — | 90 |
| Curing agent (hexa) | 10 | 10 | 10 |
| Phenol content in the novolak | <0.05 | <0.05 | 4 |
| | Melt viscosity of the binder according to DIN 53229 in [Pa · s] | | |
| at 125° C. | 24 | 384 | 12 |
| at 150° C. | 1.8 | 6 | 1.3 |
| | Flow path of the binder at 125° C. according to DIN 16916 [in mm] | | |
| | 56 | 41 | 60 |
| Fiber composite consisting of | Properties of the fiber composites cured at 180° C. | | |
| 80% by weight of cotton fibers 20% by weight of binder + curing agent | dimensionally stable adequately flexible tough composite optimum degree of crosslinking good covering of the fibers by the resin no emission smell | not dimensionally stable inadequately crosslinked little and uneven covering of the fibers by the resin no emission smell | dimensionally stable brittle too highly crosslinked good covering of the fibers by the resin phenolic emission smell |

As can be seen from the results in Table 1, the binder according to Example 2, modified according to the invention, surprisingly has all-round advantageous properties. It displays about the same good properties as the phenol-containing binder of Comparison Example 3, but without becoming brittle during the comparative thermal curing and without spreading a phenolic emission smell. According to Comparison Example 2, the non-modified phenol-free binder is not a binder which is suitable for preparation of fiber composites because of its high melt viscosity, its low flow path, its inadequate fiber-covering capacity and the associated inadequate resin binding to the fiber crossing points, and its inadequate crosslinking properties during thermal curing.

We claim:

1. A cured fiber composite molding containing a binder resin in the form of a powder, comprising a thermosetting novolak prepared by condensation of mononuclear or polynuclear phenols with less than the molar amount of formaldehyde and containing a crosslinking agent and containing no or no substantial amount of a free mononuclear phenol, wherein the novolak contains, as additional components, polyglycols selected from the group consisting of triethylene glycol, tetraethylene glycol and pentaethylene glycol and optionally at least one member selected from the group consisting of polycarboxylic acids, polycarboxylic acid anhydrides and acid esters of polyglycols and polycarboxylic acids.

2. A composite molding of claim 1 wherein the proportion of additional components is in total 0.5 to 20% by weight, based on the novolak.

3. A composite molding of claim 1 wherein, in the novolak, the molar ratio of the phenolic components to formaldehyde in the condensation product is 1:0.4 to 1:0.9.

4. A composite molding of claim 1 wherein the novolak contains condensation products of bisphenols and formaldehyde.

5. A composite molding of claim 1 wherein the novolak contained in the binder resin has a melting point in the range from 35° to 120° C. and 50% strength by weight solution thereof in 1-methoxy-2-propanol, has a viscosity at 23° C. in the range from 100 to 3000 mPa·s, measured in accordance with DIN 53177.

6. A composite molding of claim 1 wherein the resin contains, as additional components, aliphatic polyglycols which have at least 3 alkylene oxide units in the molecule and are liquid at temperatures above 5° C., or mixture thereof.

7. A composite molding of claim 1 wherein the resin contains, as additional components, heat-stable polycarboxylic acids having at least 2 carboxylic groups in the molecule, or anhydrides thereof, or acid esters of the polycarboxylic acids with aliphatic polyglycols.

8. A composite of claim 1 wherein the resin contains, as the crosslinking agent, hexamethylenetetramine or a melamine resin in an amount of 2 to 20% by weight, based on the binder resin, in uniform distribution.

9. A composite molding of claim 1 wherein the resin contains customary auxiliaries and customary fillers.

10. A process for the preparation of a cured fiber composite molding of claim 1 comprising distributing a binder resin in powder form, comprising a thermosetting novolak prepared with less than the molar amount of formaldehyde and contains a crosslinking agent and contains no or no substantial amount of a free mononuclear phenol, wherein the novolak contains, as additional components, polyglycols and optionally at least one member selected from the group consisting of polycarboxylic acids, polycarboxylic acid anhydrides and acid esters of polyglycols and polycarboxylic acids, in a naturally occurring or synthetic fiber material, fiber fleece or fiber woven fabric in the form of a web or uniform layer thickness, heating the resulting material to about 100° C. to effect partial curing of the resin and the fiber material being glued to form a prefabricated product having a layer of thickness of up to 10 cm and then heating the prefabricated product at 120° to 180° C. with shaping to complete the final crosslinking of a binder resin to obtain the cured fiber composite molding.

* * * * *